Jan. 1, 1929.
J. G. SWAIN
1,697,797
DEMOUNTABLE RIM
Filed June 14, 1923
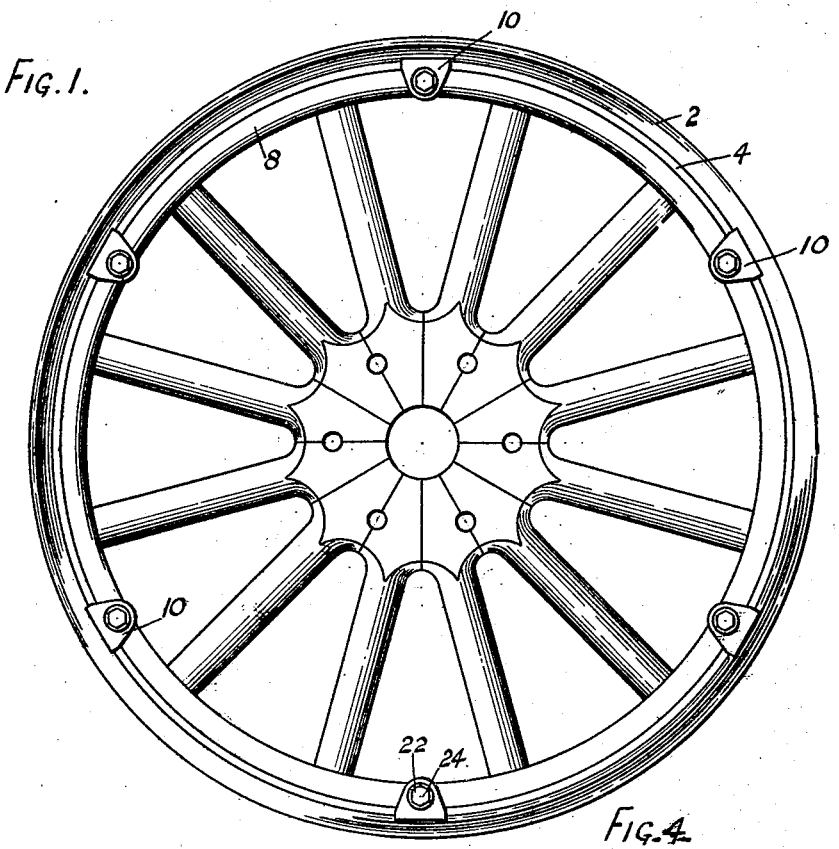
Fig. 1.
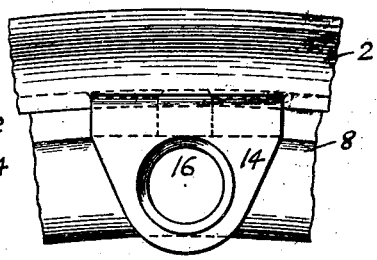
Fig. 3.
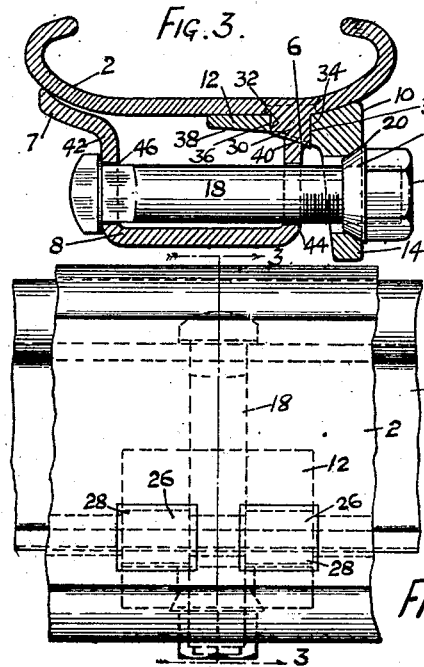
Fig. 2.
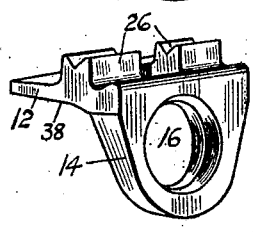
Fig. 4.
Fig. 5.
Inventor
JOSEPH G. SWAIN.
Attorney Patented Jan. 1, 1929.

1,697,797

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

DEMOUNTABLE RIM.

Application filed June 14, 1923. Serial No. 645,264.

This invention relates to vehicle wheels and has particular reference to tire carrying rims of the demountable type.

A general object of the invention is the provision of novel means whereby a tire carrying rim can be firmly and conveniently secured upon the wheel in such a manner that it may be readily removed therefrom.

A further object is to provide a demountable rim of the form in which fastening lugs are secured to the innerside of the rim in such manner that they are securely fastened to the rim by a simple riveting operation. A further object is to provide a rim which can be secured to a steel felloe without necessitating any operations upon the felloe.

These and other important features of this invention will appear from the following description read in connection with the accompanying drawings and will be particularly pointed out in the claim.

Figure 1 of the drawings shows a side elevation of a wheel with the rim attached;

Figure 2 is a part plan view of a section of the demountable rim and felloe showing my novel form of clamping means connected thereto;

Figure 3 is a section on the line 3—3 of Figure 2;

Figure 4 is a side view of my demountable rim and clamp;

Figure 5 is a detailed perspective of one of the clamps unattached.

In the illustrated embodiment of my invention, the numeral 2 indicates a demountable tire carrying rim of the well known clincher type, although it is to be understood that my invention is not limited to this particular type but may be readily used with the straight side or inextensible bead type if desired. On the inner side of the rim 2 is provided a rim supporting rib 4 which rests upon the outer flange 6 of the fixed rim 8, the inner side of the rim being supported on a rear flange 7 of the fixed rim, slightly higher than the flange 6. In order to secure the demountable rim 2 on the fixed rim 8, a suitable number of clamps 10 are employed. These clamps are substantially L shaped, one leg 12 of each of which fits against the inner surface of the demountable rim and is secured permanently to it in a manner hereinafter described, and the other leg 14 being apertured as at 16 to receive a fastening bolt 18 by which it is fastened to the fixed rim. The bolt opening 16 in the leg of the clamp is countersunk, as shown, to receive the tapered portion 20 formed on the underside of the nut 24. The outer face of the leg 12 of each clamp is provided with lugs 26 which are adapted to project through openings 28 formed in the base of the rim 2 and through cutaway portions in the supporting rib 4. The inwardly extending portion 30 of the rib 4, which is left between the openings 28, is received in an opening 32 formed in the laterally inwardly extending leg 12 of the clamp. The lugs 26, after being passed through the openings 28, are riveted over, thereby securely fastening the clamp to the tire carrying rim.

The faces 34 and 36 on both sides of the rib or lug 30 are radial to the rim and engage the adjacent sides of opening 32, so that when the clamp is placed in position it is substantially fixed when dropped in position and the riveting operation simply holds the clamp in position. The strain tending to loosen the clamp from its position is borne by the contacting faces of the clamp and the portion 30 of the rib.

It is to be noted that the inner surface of the portion 30 of the supporting rib 4 is substantially flush with the inner surface 38 of the clamp and is adapted to rest upon the inclined surface 40 of flange 6 of the fixed rim 8 in such manner as to obviate the necessity of any deformation or notching of the latter.

The flanges 6 and 42 of the fixed rim 8 are formed with a series of openings 44 and 46 through which the bolts 18 are adapted to be passed. By this arrangement it will be clear that a driving connection between the fixed rim and the demountable rim is secured and that the latter will be firmly locked upon the wheel.

The foregoing has been found to constitute an easily assembled equipment whereby a demountable rim may be securely affixed to the felloe of the wheel and readily removed therefrom. The structure is easily manufactured and durable, while, at the same time, it is comparatively light and yet sufficient to meet the requirements in wheels of this type.

I have herein disclosed my invention in connection with one embodiment thereof, selected for illustrative purposes only. Obviously, my invention is not restricted to this particular embodiment.

Having described my invention, what I claim as new and desire to secure by Letters Patent of the United States is:

The combination with a demountable tire carrying rim having pairs of apertures at circumferentially spaced points thereon of an inwardly projecting rib upon the inner surface of the rim aligned with and cut away beneath the said apertures, the inner and outer sides of said rib being radial to the rim, and clamps having radially extending lugs passing through the apertures of the rim and riveted thereto, said clamps being apertured to receive the portions of the rib between the apertures of each pair, the side of the latter apertures being formed to snugly engage the inner and outer sides of the rib.

JOSEPH G. SWAIN.